United States Patent
Tsubouchi

Patent Number: 5,129,927
Date of Patent: Jul. 14, 1992

[54] AIR DRYER FOR A VEHICLE SUSPENSION SYSTEM

[75] Inventor: Kaoru Tsubouchi, Toyota, Japan

[73] Assignee: Aisin Seiki Kabushiki Kaisha, Japan

[21] Appl. No.: 793,318

[22] Filed: Nov. 15, 1991

Related U.S. Application Data

[63] Continuation of Ser. No. 647,232, Jan. 29, 1991.

[30] Foreign Application Priority Data

Jan. 31, 1991 [JP] Japan .................. 2-8619[U]

[51] Int. Cl.$^5$ ............................................. B01D 53/04
[52] U.S. Cl. .................................. 55/163; 55/33; 55/316
[58] Field of Search ................. 55/163, 316, 318, 33

[56] References Cited

U.S. PATENT DOCUMENTS

| | | | |
|---|---|---|---|
| 2,955,673 | 10/1960 | Kennedy et al. | 55/163 |
| 3,300,949 | 1/1967 | Smylie et al. | 55/35 |
| 3,464,186 | 9/1969 | Hankison et al. | 55/163 |
| 3,472,000 | 10/1969 | Glass et al. | 55/163 |
| 4,713,094 | 12/1987 | Yanagawa et al. | 55/163 |
| 4,764,189 | 8/1988 | Yanagawa et al. | 55/163 |
| 4,892,569 | 1/1990 | Kojima | 55/163 |

FOREIGN PATENT DOCUMENTS 63-44095 11/1988 Japan .

Primary Examiner—Charles Hart
Attorney, Agent, or Firm—Finnegan, Henderson, Farabow, Garrett & Dunner

[57] ABSTRACT

The use of a blotting material in an air dryer used in vehicle suspension system is disclosed. The blotting material absorbs moisture from the intake air and prevents desiccant material contains in the air dryer from being damaged by the moisture. The blotting material also prevents rusting the intake and exhausting valve.

10 Claims, 5 Drawing Sheets

AIR DRYER FOR A VEHICLE SUSPENSION SYSTEM

This application is a continuation of application Ser. No. 07/647,232 filed Jan. 29, 1991.

BACKGROUND OF THE INVENTION

This invention relates to an air dryer which prevents condensate water from generating in an air pressure circuit for a vehicle suspension system.

Japanese Utility Model Patent Publication No. 63-44095 discloses a conventional air dryer for a vehicle suspension system having an air compressor and an air pressure actuator. The conventional air dryer comprises a housing member, a desiccant member contained in the housing member, a wall member for separating the housing member into first and second chambers, a primary port for connecting the first chamber to the air compressor, an exhaust port including a control valve provided in the exhaust port and for connecting the first chamber to the atmosphere, and a secondary port for connecting the second chamber to the air pressure actuator. Further, in the conventional air dryer, the first chamber is located horizontally with respect to the second chamber or obliquely below the second chamber.

Humid air flows from the primary port to the secondary port through the desiccant member while the air pressure is supplied from the compressor to the actuator. During this time, the humid air is dried by the desiccant member.

Further, dried air flows from secondary port to the exhaust port through the desiccant member while the air pressure is exhausted from the actuator to the atmosphere. Thus, during the pressure exhausting time, the desiccant member is re-dried by the exhausted air.

SUMMARY OF THE INVENTION

In the conventional air dryer described above, the first chamber is a merely an empty chamber. Therefore, when water drops are collect into the first chamber with the humid air (some parts of the water is collected in the first chamber), some part of the water drops will reach to the desiccant member with the humid air. Thus, the water drops wet the desiccant member. After that, when the humid air flows through the wet desiccant member, the humid air can not be dried sufficiently. Further, during the pressure exhausting time, the water which wets the desiccant member may exhaust through the one way valve and the one way valve may be rusted due to exhaust water.

Accordingly, one of the objects of this invention is to exhaust water from the first chamber to the atmosphere. A further object of this invention is to improve drying capacity of the desiccant member.

In order to achieve the above objects, the air dryer of this invention includes a blotting member provided in the first chamber. According to the air dryer of this invention, the water from the intake air is absorbed by the blotting member and hardly reaches to the desiccant member over the wall member. Therefore, the desiccant member is never made wet by the water. Thus, the desiccant member can dry the humid air sufficiently during the pressure supplying time.

Further, the desiccant member can be re-dried by the exhausted air during the exhausting time. At the same time, the exhausted air flows through blotting member and sprays the water which is absorbed in the blotting member out the exhaust valve.

In order to achieve the above objects and advantages, there is provided a housing member, a desiccant member contained in the housing member, means for separating the housing member into at least first and second chambers, a primary port for connecting the first chamber to the air compressor, an exhaust port for connecting the first chamber to atmosphere, a control valve provided in the exhaust port for selectively connecting the first chamber to the atmosphere, a secondary port provided in the second chamber and connected to the air pressure actuator, and a blotting member provided in the first chamber for absorbing moisture therein.

DETAILED DESCRIPTION OF THE PREFERRED EMBODIMENT

Referring to the enclosed drawings, the preferred embodiment is explained below.

Figure 1:
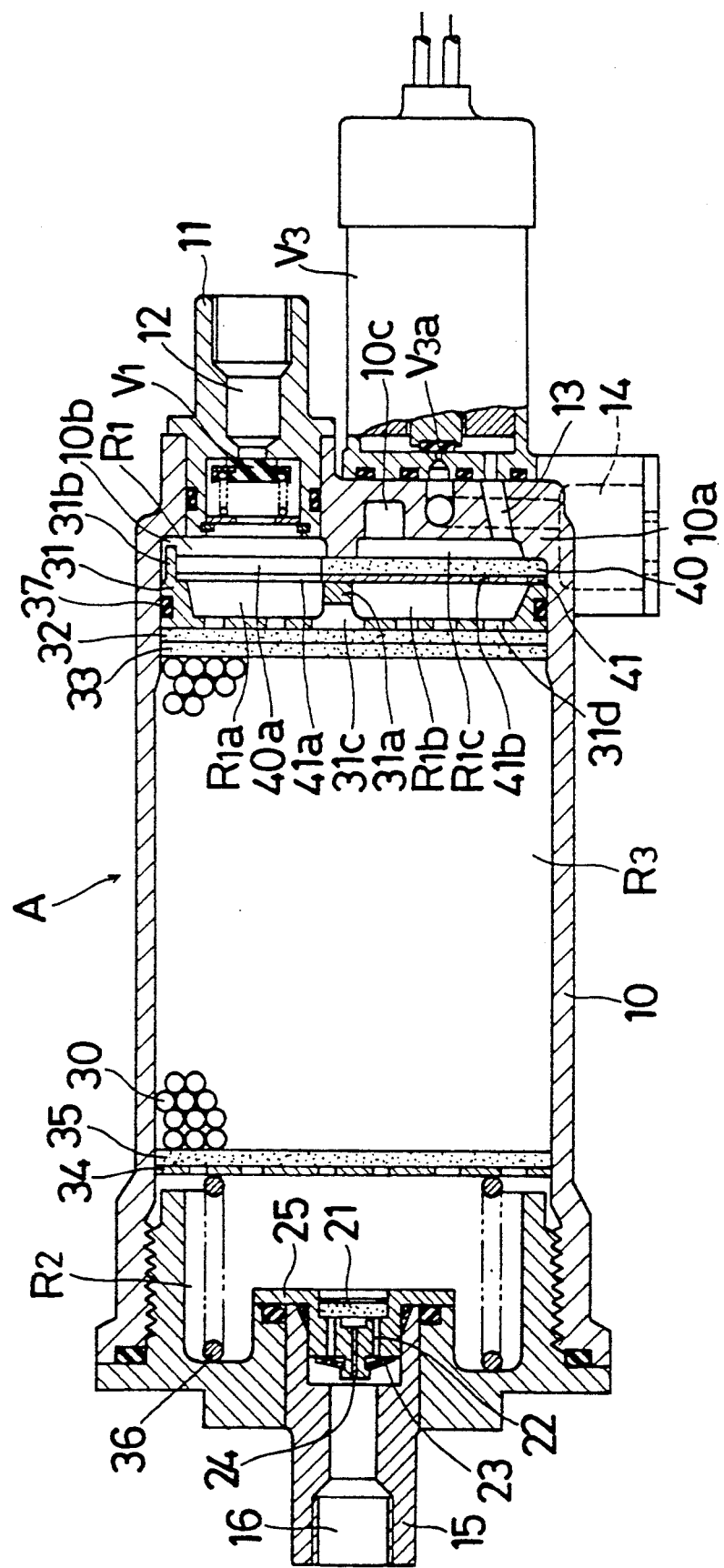
FIG. 1 is a longitudinal cross sectional view of an air dryer of the present invention.
Figure 5:
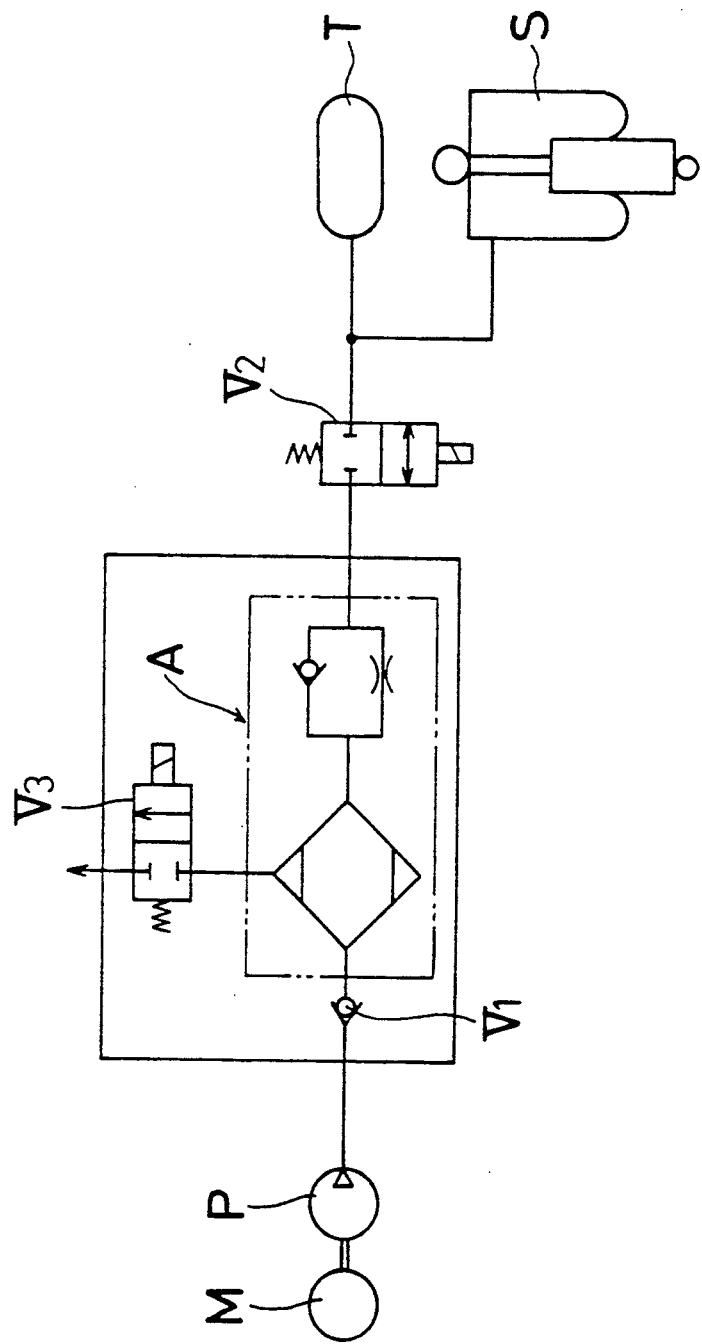
FIG. 5 is a circuit diagram showing an automobile suspension system.

FIG. 1 shows an air dryer (A) of this invention. As shown in FIG. 5, the dryer (A) is used for an air pressure circuit of an automobile air-suspension system.

The air pressure circuit of the air-suspension system comprises a compressor (P) driven by the electromagnetic motor (M), an inlet one way valve (V1), the air dryer (A) of this invention, a pressure control valve (V2), an exhaust control valve (V3), an accumulator (T), a suspension unit (S) and electronic controller (not shown) for controlling the valves (V2) and (V3). In this embodiment, the one way valve (V1) and the exhaust control valve (V3) are assembled integrally with the air dryer (A).

As shown in FIG. 1, the air dryer (A) includes housing member (10) which further includes a sleeve member and a cap. An inlet union (11) is assembled to right side of the housing member (10). The inlet union (11) integrally joins the inlet one way valve (V1) which includes a primary port (12). An exhaust port (13) and a vent passage (14) are formed integrally to the right side of the housing member (10). A plunger valve (V3a) is interconnected between the exhaust port (13) and the vent passage (14) so as to open and close the exhaust port (13).

An outlet union (15) is connected to the left side of the housing (10) so as to be fluid-tight. The outlet union (15) fluid tightly joins a secondary port (16) and a plug (25) which further includes a filter (21), an air flow passage (22), a one way valve (23) and an orifice (24).

The housing member (10) contains a required quantity of granular silica gel (30). Of course, another desiccant can be used instead of silica gel (30). The granular silica gel (30) is located between two wall members. The wall members comprise a separator (31), filters (32)

and (33), a punched plate (34) and a filter (35). The housing member (10) is divided into first and second chambers (R1) and (R2) by the wall members. The first chamber (R1) communicates with the primary port (12) and the exhaust port (13). The second chamber (R2) communicates with the secondary port (16). The granular silica gel (30), the separator (31), the filter (32), the filter (33), the punched plate (34) and the filter (35) are forced by a spring member (36) toward the first chamber (R1) so as to press the granular silica gel (30) densely.

The filter (32) has larger meshes than that of the filter (33). The filter (32) breaks water drops into smaller pieces so that the water drops can be absorbed by the granular silica gel (30) more efficiently while the waterdrops pass through the granular silica gel (30). Also, the filter (35) prevents the granular silica gel (30) from spilling into the second chamber (R2) even if the granular silica gel (30) are broken into pieces by some physical factors like vibrations.

Figure 2:
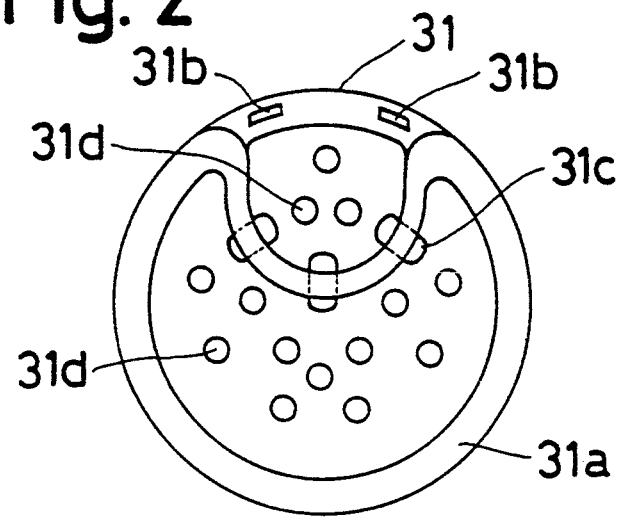
FIG. 2 is a front view of the air dryer shown in FIG. 1.

As shown in FIG. 2, a land (31a) forms a closed loop. As shown in FIG. 1, the land (31a) projects to the right side of the separator (31). A blotting member (40) is provided with a plate (41) between the separator (31) of the first chamber (R1) and the exhaust port (13). The air flows to the exhaust port (13) through the blotting member (40). An 'O'-shaped ring (37) is attached to a circumference of the separator (31). The ring (37) stops the water from flowing from the first chamber (R1) through the circumference of the separator (31).

Figure 3:
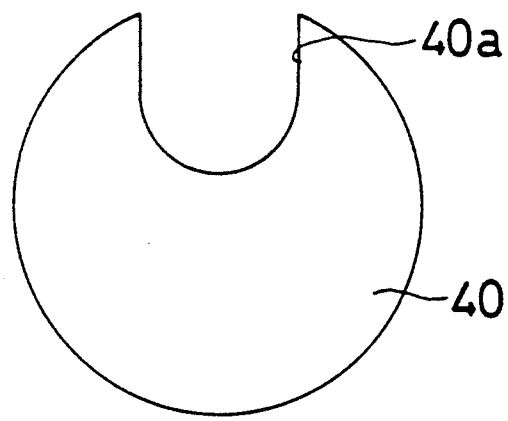
FIG. 3 is a front view of a blotting member shown in FIG. 1.
Figure 4:
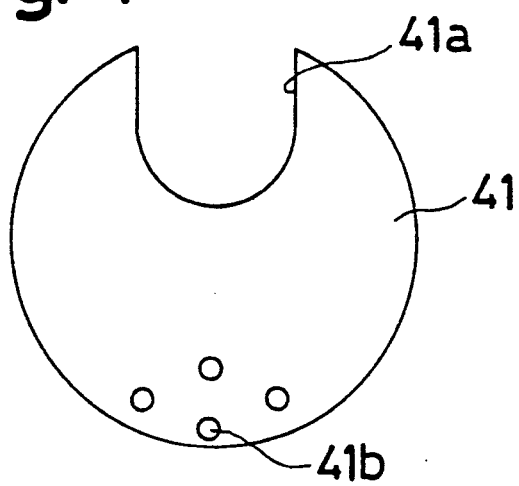
FIG. 4 is a front view of a plate shown in FIG. 1.

The blotting member (40) is made from a substance which absorbs the water and passes the air well, i.e. a water absorbent and air permeable material. As shown in FIG. 3, the blotting member (40) has a notch (40a) which is located at the primary port (12). The blotting member (40) is attached to a land (10a) which is provided on the right-end portion of the housing (10). The land (10a) has almost the same shape as the land (31a) of the separator (31). As shown in FIG. 4, as in the blotting member (40), the plate (41) has a notch (41a) which is located at the primary port (12). The plate (41a) has a plurality of holes (41b) at a lower side in FIG. 4. The plate (41a) is assembled between the separator (31) and the blotting member (40). The blotting member (40) and the plate (41) are pressed toward the right side in FIG. 1 with the separator (31) by the spring member (36). Thus, the blotting member (40) is tightly pressed to the land (10a) of the housing (10). The blotting member (40) can prevent dust from entering the exhaust control valve (V3). As shown in FIGS. 1 and 2, the separator (31) has a pair of projections (31b). These projections (31b) are engaged with depressions (10b) of the housing member (10) so as to insert the separator (31) at a proper rotational position.

In this embodiment, the first chamber (R1) is divided into a chamber (R1a) for communicating with the primary port (12), a chamber (R1b) for communicating with the chamber (R1a) through passages (31c) which is provided in the separator (31) and a chamber (R1c) for communicating the chamber (R1b) through both the holes (41b) of the plate (41) and blotting member (40). The chamber (R1c) also communicates with the chamber (R1a) through the blotting member (40). The chambers (R1a) and (R1b) communicate with a desiccant chamber (R3) which contains the granular silica gel (30) through holes (31d) of the separator (31) and two filters (32) and (33).

The air dryer of this invention is used at a certain position so that the first chamber (R1) is located horizontally with respect to the second chamber (R2) or is located obliquely below the second chamber (R2). During a pressure supplying time (i.e. while the pressure control valve (V2) is opened and the exhaust control valve (V3) is closed), the pressurized air from the compressor (P) comes from primary port (12) to the first chamber (R1) through the inlet one way valve (V1). The pressurized air passes through the notches (40a) and (41a) of the filter member (40) and the plate (41), and reaches to the desiccant chamber (R3) through the passages (31c), the holes (31d) and the two filters (32) and (33). During the pressure supplying time, the humid air is dried by the granular silica gel (30). The dried air flows to the second chamber (R2) through the filter (35) and the punched plate (34). The dried air conducts from secondary port (15) to the accumulator (T) and suspension unit (S) through the filter (21), the air flow passage (22), the one way vale (23) and the orifice (24).

During the air exhausting time (i.e. while the both control valves (V2) and (V3) are opened), the air which is contained in the air dryer (A) is exhausted from the exhaust port (13) to the vent passage (14) through the exhaust control valve (V3). During the exhausting time, the air returns only through the orifice (24). Therefore, an inner pressure of the dryer (A) decreases suddenly as soon as the exhaust control valve (V3) is opened. Thus, the humidity which is absorbed in the granular silica gel (30) is emitted and exhausted to the atmosphere with the air which is gradually returned from the secondary port (16). Thus during the exhausting time, the granular silica gel (30) is re-dried.

According to the air dryer of this invention, the blotting member (40) and the plate (41) are contained in the chamber (R1). Therefore, while the humid air is passed from the primary port (12) to the first chamber (R1) and creates water drops, the water drops are absorbed by the blotting member (40). The blotting member (40) absorbs the water drops due to a capillary action until maximum capacity of absorption. Thus, the water remains in the first chamber (R1), and hardly any enters the granular silica gel (30) over the separator (31) and the filters (32) and (33). Therefore, the granular silica gel (30) is hardly wet by the water, and can dry the humid air sufficiently while the humid air flows from the primary port (12) to the secondary port (16).

Further, while the dried air is exhausted from the secondary port (16) to the exhaust port (13), the humid granular silica gel (30) is re-dried. Further, the exhausted air sprays the water which is absorbed in the blotting member (40). Thus, the absorbed water is sprayed as humidity and mist. After that, the air is exhausted from the exhaust control valve (V3) to the atmosphere with humidity and mist. According to this embodiment, the holes (41b) are placed at the lower position of the plate (41). Therefore, during the pressure exhausting time, the air flows through the most humid portion of the blotting member (40). Thus, the spray-effect for emitting the water can be obtained efficiently. Further, according to this embodiment, the 'O'-shaped ring (37) is attached to the circumference of the separator (31). Therefore, even if the water is collected in the first chamber (R1) which exceeds the capacity of the blotting member (40), the excessive water is retained in the bottom of the first chamber (R1), and hardly any enters the desiccant chamber (R3). Thus, the granular silica gel (30) is separated from the excessive water.

As described above, according to this embodiment, the blotting member (40) prevents the granular silica gel (30) from wetting. Therefore, the granular silica gel (30) absorbs the humidity of breathed air sufficiently, and is re-dried sufficiently by the exhaust air. Thus, an absorbing capability of the granular silica gel (30) is greatly improved, and the air dryer can be compact.

Further, according to this embodiment, the water which is collected in the first chamber (R1) is sprayed by the exhaust air flow. Therefore, the exhaust control valve (V3) is not so prone to rust. Thus, the plunger valve (V3a) remains in a good condition for long time. Further, a durable and reliable air pressure circuit can be obtained by using the air dryer (A).

In the embodiment described above, the 'O'-shaped ring (37) is attached to the circumference of the separator (31) so as to retain the excessive water which is collected over the capacity of the blotting member (40) in the first chamber (R1). However, if the quantity of the water which is collected in the first chamber (R1) never exceeds the capacity of the blotting member (40), the embodiment shown in FIGS. 6 and 7 can be used instead of the above described embodiment. According to the embodiments shown in FIGS. 6 and 7, a separator (131) is used instead of the separator (31), and the 'O'-shaped ring (37) is omitted. The separator (131) includes a land (131a) which is divided into four parts, a pair of projections (131b) which are rotational stoppers and many passages (131c).

In the embodiment described above the first chamber (R1) is located horizontally with respect to the second chamber (R2)or is located obliquely under the second chamber (R2). However, the air dryer (A) of this embodiment can be used when the first chamber (R1) is located below the second chamber (R2). In other words, the air dryer (A) of this embodiment can be used when the dryer (A) is vertically installed.

The pressure exhausting time does not always occur after the every pressure supplying time. Further, when the dryer (A) is installed vertically and the exhausting port (13) is located at the lower side, some depressions may be formed in the air dryer (A). Under these situations, some water may remain in the exhausting side. The water may enter to the granular silica gel (30) during the pressure supplying time. Further, the water may remain in the exhaust control valve (V3) so as to rust the plunger valve (V3a).

However, in the embodiment described above, even if the first chamber (R1) is located below the second chamber (R2), the water is absorbed by the blotting member (40). Thus, the damage of the granular silica gel (30) can be minimized. Further, during the exhausting time, the water is sprayed as humidity and mist, and the humidity and mist are passed through the exhaust control valve (V3). Thus, the exhaust control valve is protected from rust.

Figure 6:
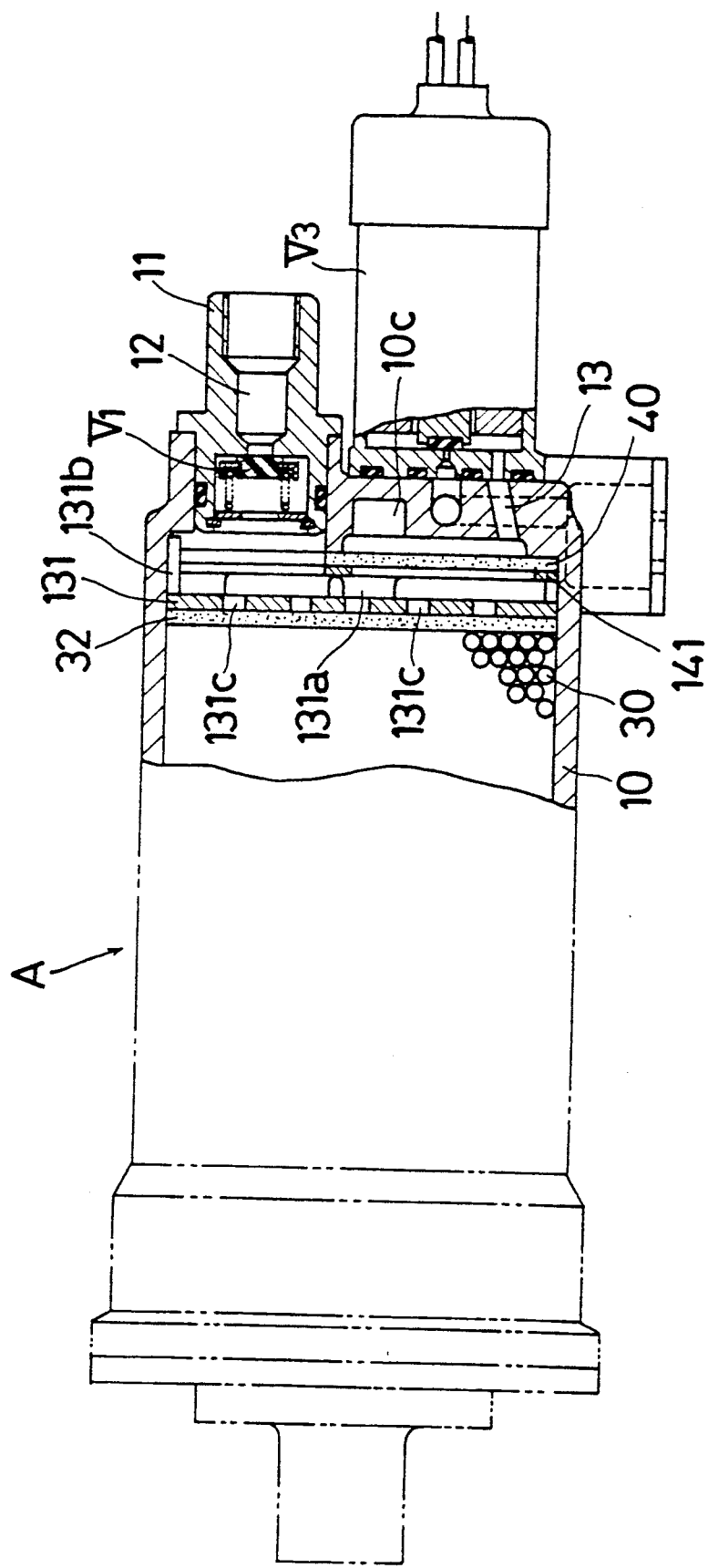
FIG. 6 is a partial longitudinal cross sectional view showing another embodiment of this invention.
Figure 7:
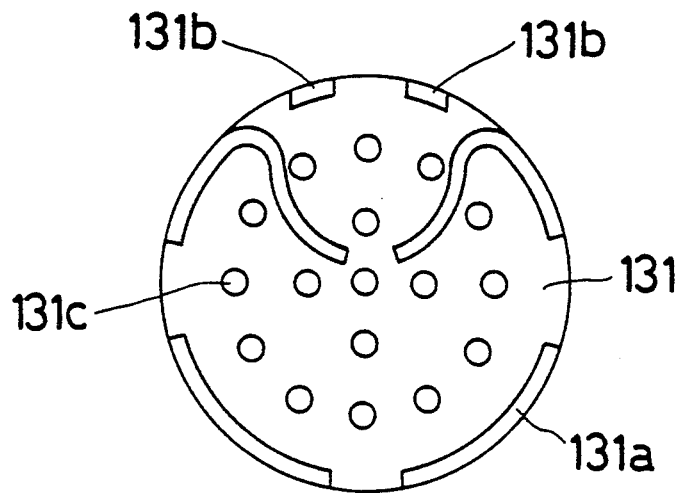
FIG. 7 is a front view of a separator shown in FIG. 6.
Figure 8:
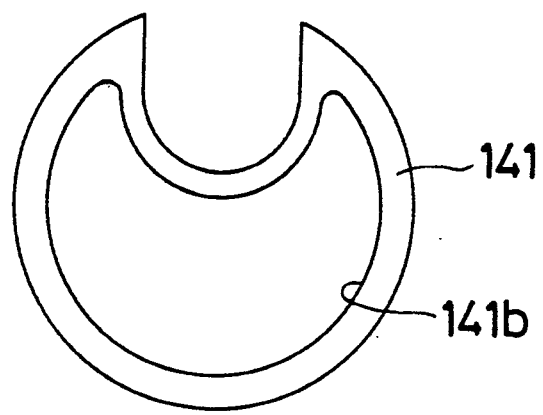
FIG. 8 is a front view of the plate shown in FIG. 6.

FIGS. 6~8 show the air dryer (A) which has the first chamber (R1) below the second chamber (R2). In this embodiment, large holes (141b) are provided in a plate (141). The holes (141b) have a symmetrical shape with the land (131a).

In this embodiment, the humid air and the water drops may enter the first chamber (R1). However, the water drops are almost all absorbed by the blotting member (40) due to an air flow in the first chamber (R1). Therefore, less of the water drops enter the granular silica gel (30). Further, the water does not remain in a depression (10c) which is provided for creating a flat surface where the exhaust control valve (V3) is fixed. Further, during the exhausting time, the water which is absorbed in the blotting member (40) is sprayed into the atmosphere, since the air is exhausted through the blotting member (40). Therefore, the water does not remain in the exhaust control valve (V3). Thus, the exhaust control valve (V3) is not rusted.

Further, according to each of the above mentioned embodiments, the inlet one way valve (V1) is assembled integrally with the exhaust control valve (V3). However, this invention can be adopted to an air dryer which separates the inlet one way valve (V1) from the exhaust control valve (V3). The inlet one way valve (V1) prevents inner pressure of the dryer front acting to the compressor (P) side. During the exhausting time, the inlet one way valve (V1) also prevents from the reverse air flow which sends the water to the primary port (12) side. However, the inlet one way valve (V1) can be omitted, when the compressor (P) is enough close to the primary port (12) and has an outlet one way valve. The outlet one way valve of the compressor (P) may combine the inlet one way valve (V1).

What is claimed is:

1. An air dryer for a vehicle suspension system having an air compressor and an air pressure actuator, said air dryer comprising:
   a housing member;
   a first chamber formed in the housing member;
   a second chamber formed in the housing member;
   a desiccant material contained between the first and second chambers;
   a primary port connecting the first chamber to the air compressor;
   an exhaust port connecting the first chamber to atmosphere;
   a secondary port connecting the second chamber to the air pressure actuator;
   control valve provided in the exhaust port for selectively connecting the first chamber to the atmosphere; and
   a blotting member for absorbing moisture in the first chamber, the blotting member being contained in the first chamber, adjacent to the exhaust port, spaced from said desiccant material and clear of air passage through said primary port.

2. An air dryer for a vehicle suspension system having an air compressor and an air pressure actuator, said air dryer comprising:
   a housing member;
   a first chamber formed in the housing member;
   a second chamber formed in the housing member;
   a desiccant material contained between the first and second chambers;
   a primary port connecting the first chamber to the air compressor;
   an exhaust port connecting the first chamber to atmosphere;
   a secondary port connecting the second chamber to the air pressure actuator;
   a control valve provided in the exhaust port for selectively connecting the first chamber to the atmosphere;
   a blotting member for absorbing moisture in the first chamber, the blotting member being contained in the first chamber, adjacent to the exhaust port, spaced from said desiccant material and clear of air passage through said primary port; and a separator between the first chamber and the desiccant material, said separator defining a first air flow path between the primary port and the desiccant material, a second air flow path between the primary port and the exhaust port, and a third air flow path between the desiccant material and the exhaust port, said blotting member being spaced by the separating member from the desiccant material and located in said second and third flow paths.

3. The air dryer recited in claim 2 wherein said separator comprises an apertured plate portion, a land portion projecting from one side of the plate portion to space the blotting member from the desiccant material, and passage means for establishing the second air flow path.

4. The air dryer recited in claim 3 wherein said passage means is defined by apertures in said plate portion bridging said land portion.

5. The air dryer recited in claim 3 wherein said passage means is defined by openings in said land portion.

6. The air dryer recited in claim 3 wherein said blotting member comprises air permeable and water absorbent material retained across said second air path by said land portion.

7. An air dryer for a vehicle suspension system having an air compressor and an air pressure actuator, said air dryer comprising:
 a housing member having an elongated peripheral wall and pair or radial and walls;
 a body of desiccant material contained in said housing between and spaced from said end walls to establish first and second chambers between opposite ends of said body and said end walls, respectively;
 a primary port connecting the first chamber to the air compressor;
 an exhaust port connecting the first chamber to atmosphere;
 a secondary port connecting the second chamber to the air pressure actuator;
 a control valve in the exhaust port for selectively connecting the first chamber to the atmosphere;
 means for defining in said first chamber, a first air flow path between the primary port and the desiccant material, a second air flow path between the primary port and the exhaust port, and a third air flow path between the desiccant material and the exhaust port, and
 a blotting member for absorbing moisture from air in said first chamber and from air flowing in said second air flow path.

8. The air dryer recited in claim 7 wherein said means for defining said first, second and third flow paths comprises a separator having an apertured plate portion, a land portion projecting from one side of the plate portion to space the blotting member from the desiccant material, and passage means to establish the second air flow path.

9. The air dryer recited in claim 8 wherein the other side of said plate portion is flat and engages said body of desiccant material.

10. The air dryer recited in claim 8 comprising means for sealing the outer periphery of said separator to the peripheral wall of said housing.

* * * * *

UNITED STATES PATENT AND TRADEMARK OFFICE
CERTIFICATE OF CORRECTION

PATENT NO. : 5,129,927

DATED : July 14, 1992

INVENTOR(S) : Kaoru Tsubouchi

It is certified that error appears in the above-identified patent and that said Letters Patent is hereby corrected as shown below:

Claim 7, column 7, line 31, change "or" to --of-- and

"and" (second occurrence) should read --end--.

Signed and Sealed this

Seventh Day of September, 1993

Attest:

BRUCE LEHMAN

Attesting Officer     Commissioner of Patents and Trademarks